United States Patent
Alford et al.

(10) Patent No.: US 7,986,925 B2
(45) Date of Patent: Jul. 26, 2011

(54) TECHNIQUES FOR CALIBRATING A TRANSCEIVER OF A COMMUNICATION DEVICE

(75) Inventors: Ronald C. Alford, Austin, TX (US); Leo G. Dehner, Austin, TX (US); Richard B. Meador, Austin, TX (US); Christian J. Rotchford, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 517 days.

(21) Appl. No.: 12/191,831

(22) Filed: Aug. 14, 2008

(65) Prior Publication Data

US 2010/0041353 A1     Feb. 18, 2010

(51) Int. Cl.
*H03C 1/62* (2006.01)
(52) U.S. Cl. .............. 455/115.1; 455/226.1; 455/550.1
(58) Field of Classification Search .......... 455/114.1, 455/114.2, 115.1, 226.1, 296, 310, 317, 550.1
See application file for complete search history.

(56) References Cited

U.S. PATENT DOCUMENTS

| | | | |
|---|---|---|---|
| 6,963,742 B2 * | 11/2005 | Boros et al. | 455/424 |
| 7,623,886 B2 * | 11/2009 | Ma et al. | 455/522 |
| 7,715,836 B2 * | 5/2010 | Vassiliou et al. | 455/423 |
| 7,742,747 B2 * | 6/2010 | Manku et al. | 455/114.1 |
| 2004/0203472 A1 * | 10/2004 | Chien | 455/68 |
| 2005/0020205 A1 | 1/2005 | Khoini-Poorfard | |
| 2006/0182197 A1 | 8/2006 | Godambe et al. | |

* cited by examiner

*Primary Examiner* — Nhan Le
(74) *Attorney, Agent, or Firm* — Yudell Isidore Ng Russell PLLC

(57) ABSTRACT

A technique for calibrating a transceiver of a wireless communication device includes selectively coupling an output node of a transmitter of the transceiver to an input node of a receiver of the transceiver. A calibration signal is provided, from the output node of the transmitter, to the input node of the receiver. The calibration signal is down-converted, with the receiver, to provide a down-converted calibration signal. A discrete Fourier transform is performed on the down-converted calibration signal. Finally, one or more correction factors are determined based on an analysis of the discrete Fourier transform of the down-converted calibration signal. At least one of the correction factors is utilized to facilitate substantial cancellation of a direct current offset associated with the transceiver.

20 Claims, 3 Drawing Sheets

TECHNIQUES FOR CALIBRATING A TRANSCEIVER OF A COMMUNICATION DEVICE

BACKGROUND

1. Field

This disclosure relates generally to techniques for calibrating a communication device and, more specifically, to techniques for calibrating a transceiver of a communication device.

2. Related Art

Electronic devices may use various modulation schemes, such as quadrature phase shift keying (QPSK) modulation, for communication. In QPSK, original data that is to be transmitted is separated into two signals (i.e., an in-phase (I) signal and a quadrature (Q) signal). The I signal is typically up-converted by mixing a sine wave of a particular frequency with the I signal and the Q signal is typically up-converted by mixing a cosine wave of the same frequency with the Q signal and, as such, the I and Q signals are ideally phase shifted by ninety degrees. The modulated I and Q signals are then combined following the up-conversion to a higher radio frequency (RF) signal, which is transmitted to and ideally down-converted and demodulated (by a receiver) to provide the original data. Transmitters/receivers may convert a signal to/from an RF signal in a single stage (direct conversion) or in multiple stages. In general, direct conversion architectures may experience relatively large direct current (DC) offsets in the differential I and differential Q baseband signals. The DC offsets, when present, may result in carrier (local oscillator (LO)) leakage and, thus, reduce a range over which a gain of a transmitter can be controlled. The DC offsets may also adversely impact transmitted signal quality, which may be defined in terms of error vector magnitude (EVM) and adjacent channel noise power measurements.

In communication systems such as wideband code division multiple access (WCDMA) communication systems, the range over which transmitter gain is required to be controlled is relatively large. For example, for transmitters operating under third generation (3G) WCDMA specifications, gain control range is required to be at least eighty decibel (dB). To achieve the gain control range for WCDMA, acceptable DC offset (DC imbalance) in the differential I and differential Q baseband signals should generally be less than about one millivolt (0.001 V).

As noted above, transmit LO feed-through may be, for example, attributed to DC imbalance. In a typical case, a DC imbalance at an input of an in-phase/quadrature (I/Q) mixer is converted to RF by a transmit LO (in the I/Q mixer). In this manner, DC imbalance may appear at an output of the I/Q mixer as LO feed-through. According to one known approach for addressing transmit LO feed-through attributable to DC imbalance, a DC offset correction (DCOC) loop has been employed to minimize baseband (BB) transmit path DC offsets at inputs of an I/Q mixer by adjusting digital-to-analog converter (DAC) inputs of a transmitter. Unfortunately, the DCOC loop approach typically requires the BB signal to be set to zero during a calibration sequence prior to transmit and does not remove transmit LO feed-through that is attributable to parasitic coupling directly to an output of an I/Q mixer (which may be a significant component to the overall transmit LO feed-through).

Another known approach to reducing transmit LO feed-through employs an RF detector that is connected (in a transmit path) following a transmitter I/Q mixer. In this case, the RF detector can be used to detect LO feed-through if a BB signal is set to zero during calibration. In general, the RF detector approach facilitates analysis of LO feed-through that is attributable to both DC imbalance (in the transmit path) and parasitic coupling of the transmit LO directly to an output of an I/Q mixer. Unfortunately, when BB gain control is employed (i.e., when varying BB signal levels are applied during actual transmission), an average DC imbalance across inputs of an I/Q mixer changes. In this case, LO feed-through (and the RF output level) varies when BB gain control is employed. As such, the RF detector approach is generally incompatible in situations where variable BB signals are applied and typically cannot discriminate between undesired LO feed-through tones and undesired image tones that are present. Another known approach to reducing LO feed-through has utilized a power detector (e.g., employed to monitor and feedback transmit power levels for output power control) to detect LO feed-through when a BB transmit signal is set to zero. Unfortunately, the power detector approach also does not facilitate minimizing undesired LO feed-through or image tones when a varying BB signal is applied to an input of a transmitter.

An electrical signal may be represented in the time-domain (as a variable that changes with time) or may be represented in the frequency-domain (as energy at specific frequencies). In the time-domain, a sampled digital signal includes a series of data points that correspond to an original physical parameter, e.g., light, sound, temperature, and velocity. In the frequency-domain, a sampled digital signal is represented as discrete frequency components, e.g., sinusoidal waves. A sampled digital signal may be transformed from the time-domain to the frequency-domain using a discrete Fourier transform (DFT). Conversely, a sampled digital signal may be transformed from the frequency-domain to the time-domain using an inverse DFT (IDFT).

As is well known, a DFT is a digital signal processing transformation that is employed in various applications. DFTs and IDFTs facilitate signal processing in the frequency-domain, which can provide efficient convolution integral computation (which is, for example, useful in linear filtering) and signal correlation analysis. As the direct computation of a DFT requires a relatively large number of arithmetic operations, the direct computation of a DFT is typically not employed in real-time applications. Various fast Fourier transform (FFT) algorithms have been created to perform real-time tasks, such as digital filtering, audio processing, and spectral analysis for speech recognition.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
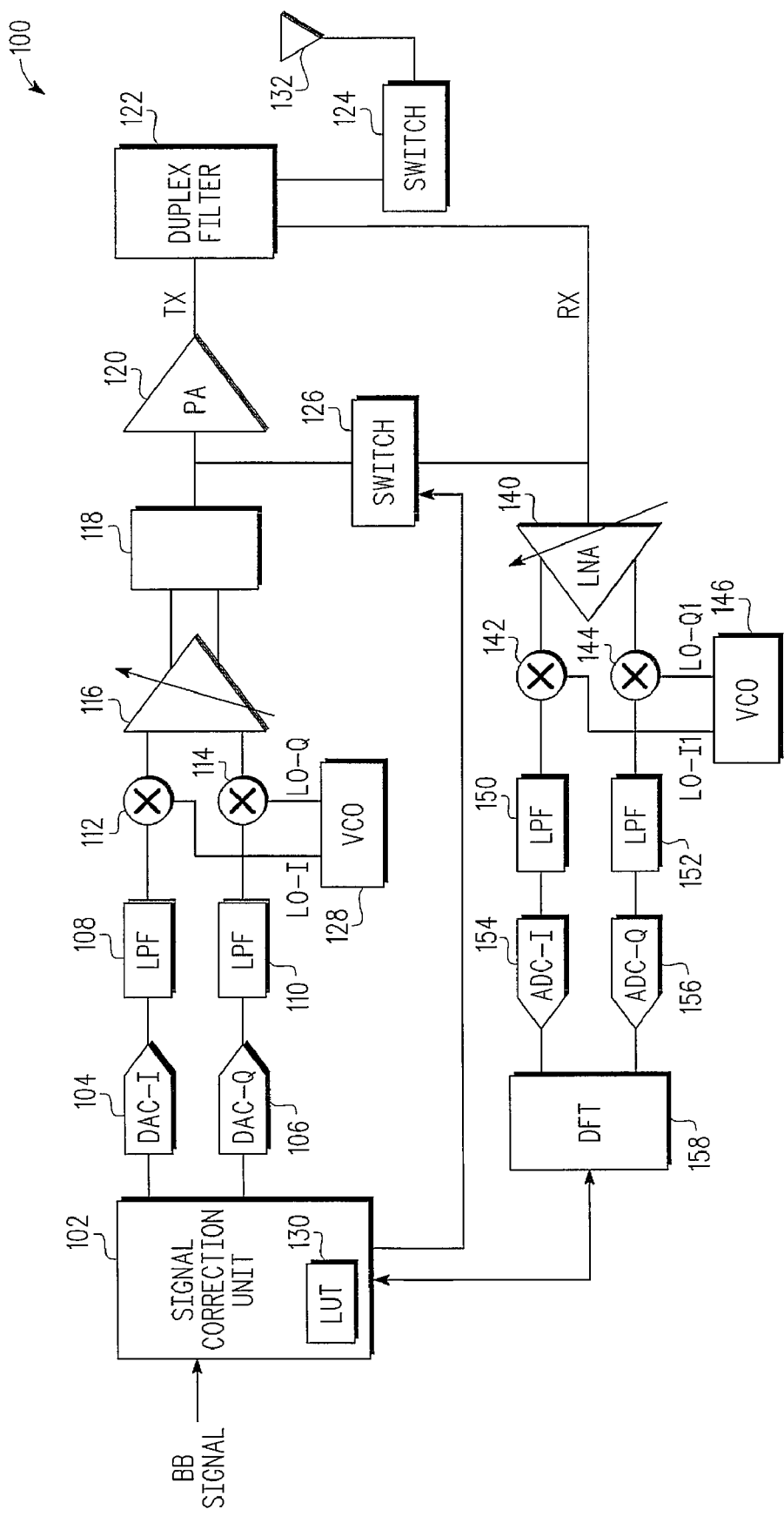
FIG. 1 is a block diagram depicting a relevant portion of a transceiver configured according to an embodiment of the present invention.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although one embodiment is described below with respect to a wireless communication device that may take the form of a mobile telephone, it will be appreciated that the present invention is not so limited and may be embodied in other electronic devices.

While a prior generation transceiver has employed a receive path calibration process that utilizes discrete Fourier transform (DFT) capabilities of the receive path, the prior generation transceiver required a relatively significant amount of additional hardware to provide a calibration signal for injection into the receive path. According to various aspects of the present disclosure, calibration processes are implemented that minimize additional hardware requirements (e.g., the additional hardware requirements may be limited to a switch that couples an output node of a transmitter to an input node of a receiver and a receive path look-up table (LUT)). In various disclosed embodiments, a transmit path of a transceiver is utilized to provide a calibration signal to a receive path of the transceiver. In contrast to known calibration processes, the disclosed calibration processes may be utilized to calibrate both receive and transmit paths of a transceiver.

According to various aspects of the present disclosure, calibration techniques are employed to improve rejection of local oscillator (LO) feed-through and image responses in a transceiver of a communication system. In general, the disclosed calibration techniques facilitate improved error vector magnitude (EVM) signal quality for wireless communication systems (e.g., long-term evolution (LTE) wireless communication systems whose EVM requirements are typically more stringent than prior wireless communication systems, such as wideband code division multiple access (WCDMA) wireless communication systems), as LO feed-through and image responses are significant contributors to EVM degradation. Various disclosed calibration techniques may be employed to minimize undesired tones/responses in both a receiver and a transmitter of a transceiver and, in this manner, improve EVM results. In a transceiver that is designed to employ a discrete Fourier transform (DFT) approach (e.g., a fast Fourier transform (FFT) approach) in a receive path, the disclosed calibration techniques may be implemented with substantially no additional hardware overhead (e.g., limited to an additional switch and a receive path LUT). In typical orthogonal frequency division multiplex (OFDM) based applications such as long-term evolution (LTE) and WiMax, a receive path DFT (e.g., fast Fourier transform (FFT)) capability is employed to examine a transmit output spectrum of an associated transmitter in a pre-transmit calibration sequence such that LO feed-through and image responses can be minimized for a transmit path of a transceiver during actual voice and/or data transmission.

According to various aspects of the present disclosure, LO feed-through and finite image rejection impairments, which may be present for both receive and transmit paths of a transceiver, may be addressed in a number of ways. For example, a calibration process may remove receive path I/Q gain and phase imbalances prior to addressing transmit path impairments or alternatively a calibration process may be configured to substantially ignore receive path I/Q gain and phase imbalances (by using only the I or only the Q receive path) while calibrating the transmit path. If the receive path I/Q gain and phase imbalances are substantially ignored, the transmit path LO feed-through and image rejection can still usually be adequately addressed independent of receive path impairments.

According to one aspect of the present disclosure, a receive path calibration process is employed prior to a transmit path calibration process. In this case, a switch is initially closed to connect a transmit path output to a receive path input. Next, a direct current (DC) only signal is applied to a BB transmit path node. Then, an unmodulated transmit carrier is injected into the receive path. Next, the unmodulated transmit carrier is down-converted by a receiver mixer (that has an associated local oscillator (LO)) to produce a beat tone at $\Delta LO$. Then, a complex DFT (e.g., a fast Fourier transform (FFT)) is performed (e.g., using a digital signal processor (DSP)) to produce outputs at DC, $+\Delta LO$ and $-\Delta LO$ with other products filtered by a low-pass filter (LPF) associated with the receiver. An algorithm (e.g., implemented in hardware or software) may then be employed to estimate receive path correction factors (receiver correction factors) that, for example, minimize I/Q amplitude and phase imbalance, the DC offset, and the $-\Delta LO$ image term. The estimated receiver correction factors may then be stored in a receive path calibration look-up table (LUT), which may be located within, for example, a signal correction unit. Receive path impairments may then be subtracted from subsequent DFT results associated with a transmit path.

According to various aspects of the present disclosure, a transmit path calibration process may be employed in combination with the receive path calibration process (i.e., following the receive path calibration process) or exclusive of the receive path calibration process. When the receive path calibration process is not employed (to remove receive path impairments) prior to the transmit path calibration process, usually only the I or only the Q channel of the receive path is employed during the transmit path calibration process. In this case, receive path I/Q amplitude and phase imbalances are substantially ignored (as only the I or Q channel is used in the receive path) during transmit path calibration. Initially, a switch is closed to connect the transmit path output to the receive path input. Next, a single frequency BB tone is applied to the BB transmit path node. Then, a single-sideband (SSB) modulated transmit carrier (which includes undesired transmit LO feed-through and transmit image products attributable to the transmit path) is provided to the receive path. The SSB modulated transmit carrier is down-converted by the receiver mixer (which employs an LO) to produce a signal at $\Delta LO-BB$ (with accompanying undesired tones at $\Delta LO$ and $\Delta LO+BB$). To reduce a required receiver dynamic range, if BB is equal to $\Delta LO$, the $\Delta LO-BB$ signal can be placed at DC and blocked via alternating current (AC) coupling in the BB receive path. The BB transmit DC offset and I/Q phase imbalance can then be adjusted by an algorithm (e.g., implemented in hardware or software) to minimize the undesired $\Delta LO$ and $\Delta LO+BB$ tones, which minimizes transmit path impairments.

Advantageously, the disclosed techniques facilitate removal of both receive and transmit impairments in the presence of a variable amplitude BB signal. In particular, the disclosed calibration processes facilitate minimization of transmit modulator LO feed-through in transmitters that require BB gain control to realize greater than an eighty decibel (dB) automatic gain control (AGC) range, which is, for example, required in WCDMA systems. In such wide range AGC systems, minimization of LO feed-through at varying output power levels requires a calibration process for removing transmit LO feed-through while BB signals of varying amplitude are present. As noted above, known calibration processes have not facilitated both LO feed-through and image suppression at varying BB input levels without requiring significant additional hardware. The disclosed calibration processes may be readily implemented in virtually any transceiver that employs a DFT capability in a receive path of the transceiver.

According to one aspect of the present disclosure, a technique for calibrating a transceiver of a wireless communication device includes selectively coupling an output node of a transmitter of the transceiver to an input node of a receiver of the transceiver. A calibration signal is then provided, from the output node of the transmitter, to the input node of the receiver. The calibration signal is down-converted, with the receiver, to provide a down-converted calibration signal. A discrete Fourier transform is performed on the down-converted calibration signal. Finally, one or more correction factors are determined based on an analysis of the discrete Fourier transform of the down-converted calibration signal. At least one of the correction factors is utilized to facilitate substantial cancellation of a direct current offset associated with the transceiver.

According to another aspect of the present disclosure, a technique for calibrating a transceiver of a wireless communication device includes applying a transmitter calibration signal to an input node of a transmitter of the transceiver. The transmitter calibration signal is up-converted by the transmitter and is then down-converted, in a receiver of the transceiver, to provide a down-converted transmitter calibration signal. A discrete Fourier transform is performed on the down-converted transmitter calibration signal. One or more transmitter correction factors are determined based on an analysis of the discrete Fourier transform of the down-converted transmitter calibration signal. At least one of the transmitter correction factors is utilized to facilitate substantial cancellation of a direct current offset associated with the transmitter.

According to another aspect of the present disclosure, a wireless communication device includes a transmitter and a receiver. An input node of the receiver is configured to receive a calibration signal from an output node of the transmitter. The receiver is configured to down-convert the calibration signal to provide a down-converted calibration signal. The receiver is also configured to perform a discrete Fourier transform on the down-converted calibration signal and determine one or more correction factors based on an analysis of the discrete Fourier transform of the down-converted calibration signal. At least one of the correction factors is utilized to facilitate substantial cancellation of a direct current offset associated with the wireless communication device.

With reference to FIG. 1, a relevant portion of an example transceiver 100, configured according to one or more embodiments of the present disclosure, is depicted. The transceiver 100 includes a signal correction unit 102 that receives baseband (BB) signals for transmission. The correction unit 102 is configured to adjust (based on transmit path correction factors (transmitter correction factors) or transmitter correction factors and receiver correction factors) the BB signal to reduce LO feed-through. For example, the unit 102 may adjust I and/or Q signal amplitudes and/or I and/or Q signal phases, as well as DC offset to reduce LO feed-through based on the transmitter and receiver correction factors. As is discussed in further detail below, after correction, a digital I signal is provided to an input of a digital-to-analog converter (DAC) 104 (labeled "DAC-I"), which converts the I signal to an analog I signal. Similarly, after correction, a digital Q signal is provided to an input of a DAC 106 (labeled "DAC-Q"), which converts the Q signal to an analog Q signal. The analog I signal is filtered by low-pass filter (LPF) 108 and the analog Q signal is filtered by LPF 110.

An output of the LPF 108 is coupled to a first input of mixer 112 and an output of the LPF 110 is coupled to a first input of mixer 114. A second input of the mixer 108 is configured to receive a local oscillator (LO) signal (labeled "LO-I") and a second input of the mixer 110 is configured to receive a LO signal (labeled "LO-Q"). The LO-I and LO-Q signals are provided from quadrature generation circuitry included within voltage controlled oscillator (VCO) 128. Outputs of the mixers 112 and 114 are coupled to respective differential inputs of a variable gain amplifier (VGA) 116, whose respective differential outputs are coupled to respective primary inputs of transformer 118, whose respective secondary outputs are coupled to an input of power amplifier (PA) 120 and a common point (e.g., ground), respectively. An output of the PA 120 is coupled to an input of duplex filter 122, whose first terminal is coupled to a first terminal of switch 124, whose second terminal is coupled to antenna 132. An output of the duplex filter 122 is coupled to an input of low noise amplifier (LNA) 140.

The input of the PA 120 is also coupled to a first terminal of switch 126 (which may be, for example, a metal-oxide semiconductor field-effect transistor (MOSFET)). A control terminal of the switch 126 is coupled to an output of the signal correction unit 102, which provides a control signal that causes the switch 126 to transition to a low impedance state during calibration. Alternatively, the control signal may be provided by a different control unit. An output of the switch 126 is coupled to the input of the LNA 140. Respective differential outputs of the LNA 140 are coupled to a first input of a mixer 142 and a first input of a mixer 144. A second input of the mixer 142 is coupled to an I output of VCO 146 and a second input of the mixer 144 is coupled to a Q output of the VCO 146.

A quadrature generation unit included within the VCO 146 is configured to provide the LO-I1 signal to the second input of the mixer 142 and the LO-Q1 signal to the second input of the mixer 144. An output of the mixer 142 is coupled to an input of LPF 150, whose output is coupled to an input of an analog-to-digital converter (ADC) 154 (labeled "ADC-I"). An output of the mixer 144 is coupled to an input of LPF 152, whose output is coupled to an input of an analog-to-digital converter (ADC) 156 (labeled "ADC-Q"). An output of the ADC 154 is coupled to a first input of a DFT block 158 and an output of the ADC 156 is coupled to a second input of the DFT block 158. The DFT block 158 may correspond to, for example, a digital signal processor (DSP) that is programmed to perform DFTs and is coupled to the signal correction unit 102.

Figure 2:
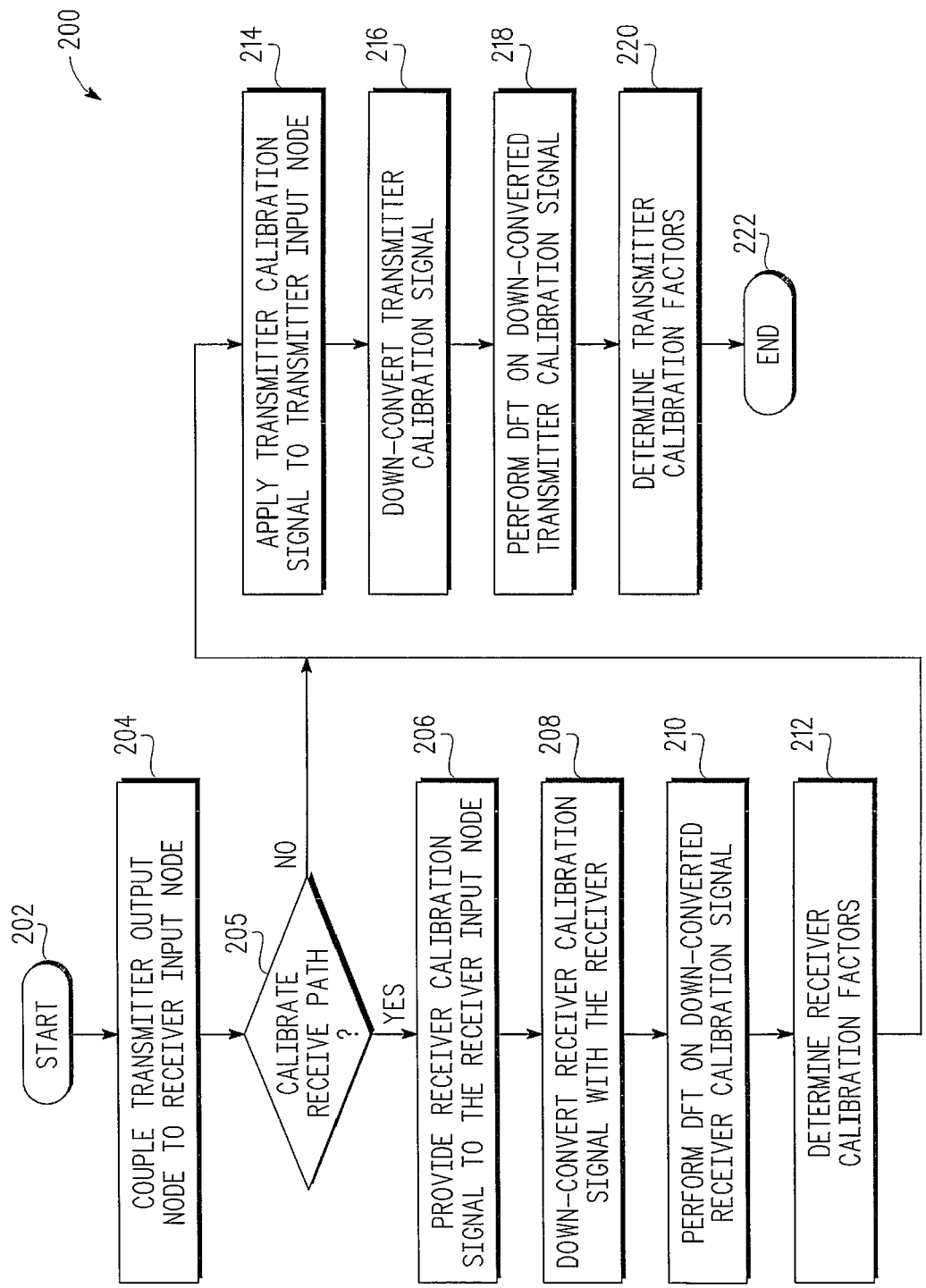
FIG. 2 is a flowchart of a process for calibrating a transceiver according to various embodiments of the present invention.

With reference to FIG. 2, a flowchart for a calibration process 200 for calibrating a transceiver (including a transmitter and a receiver), according to various embodiments of the present invention, is depicted. For ease of understanding, the process 200 is described in conjunction with the example transceiver 100 of FIG. 1. In block 202, the process 200 is initiated. Next, in block 204, an output node of the transmitter is coupled (e.g., using the switch 126) to an input node of the receiver. Then, in decision block 205, the process 200 determines whether a receive path of the transceiver is to be calibrated, prior to calibration of a transmit path of the transceiver. If the receive path is to be calibrated in block 205, control transfers to block 206, where a receiver calibration signal is provided (via the VCO 128 and the mixer 112 and/or the mixer 114, the VGA 116, the transformer 118, and the switch 126) to the input node (i.e., the input of the LNA 140) of the receiver.

Next, in block 208, the receiver calibration signal is down-converted by the receiver. Then, in block 210, a DFT (e.g., an FFT) is performed (using the DFT block 158) on the down-converted receiver calibration signal. Next, in block 212, one or more receiver calibration factors are determined from the DFT. The receiver calibration factors may correspond to different factors that, for example, are utilized to minimize I/Q amplitude and phase imbalance, as well as DC offset, based on the values (provided by the DFT) at various discrete frequencies. For example, one of the receiver calibration factors may be subtracted from a BB signal (by the signal correction unit 102) to correct for DC offset. In this manner, I and Q signals are adjusted in the signal correction unit 102 based on the receiver calibration factors. From block 212, control transfers to block 214.

In block 205 when calibration is not performed on the receive path, control transfers to block 214, where a transmitter calibration signal is applied to an input node (i.e., the input of the signal correction unit 102) of the transmitter. Next, in block 216, the transmitter calibration signal (which is up-converted by the transmitter) is down-converted by the receiver (as the output of the transformer 118 of the transmitter is coupled to the input node (i.e., the input of the LNA 140) of the receiver via the switch 126). Then, in block 218, a DFT (e.g., an FFT) is performed on the down-converted transmitter calibration signal. Next, in block 220, one or more transmitter calibration factors are determined based on the DFT of the down-converted transmitter calibration signal. The transmitter calibration factors may correspond to different factors that, for example, are utilized to minimize I/Q amplitude and phase imbalance, as well as DC offset, based on the values (provided by the DFT) at various discrete frequencies. For example, one of the transmitter calibration factors may be subtracted from a BB signal (by the signal correction unit 102) to correct for DC offset. In this manner, I and Q signals are adjusted in the signal correction unit 102 based on the transmitter calibration factors. Following block 220, the process 200 terminates and control returns to a calling process in block 222. When a BB signal varies, the calibration process 200 may be carried out multiple times (for a transmitter, a receiver, or both the transmitter and receiver). Moreover, the calibration process 200 may be performed at multiple respective frequencies (serially or in parallel) across a frequency band (for a transmitter, a receiver, or both the transmitter and receiver).

Figure 3:
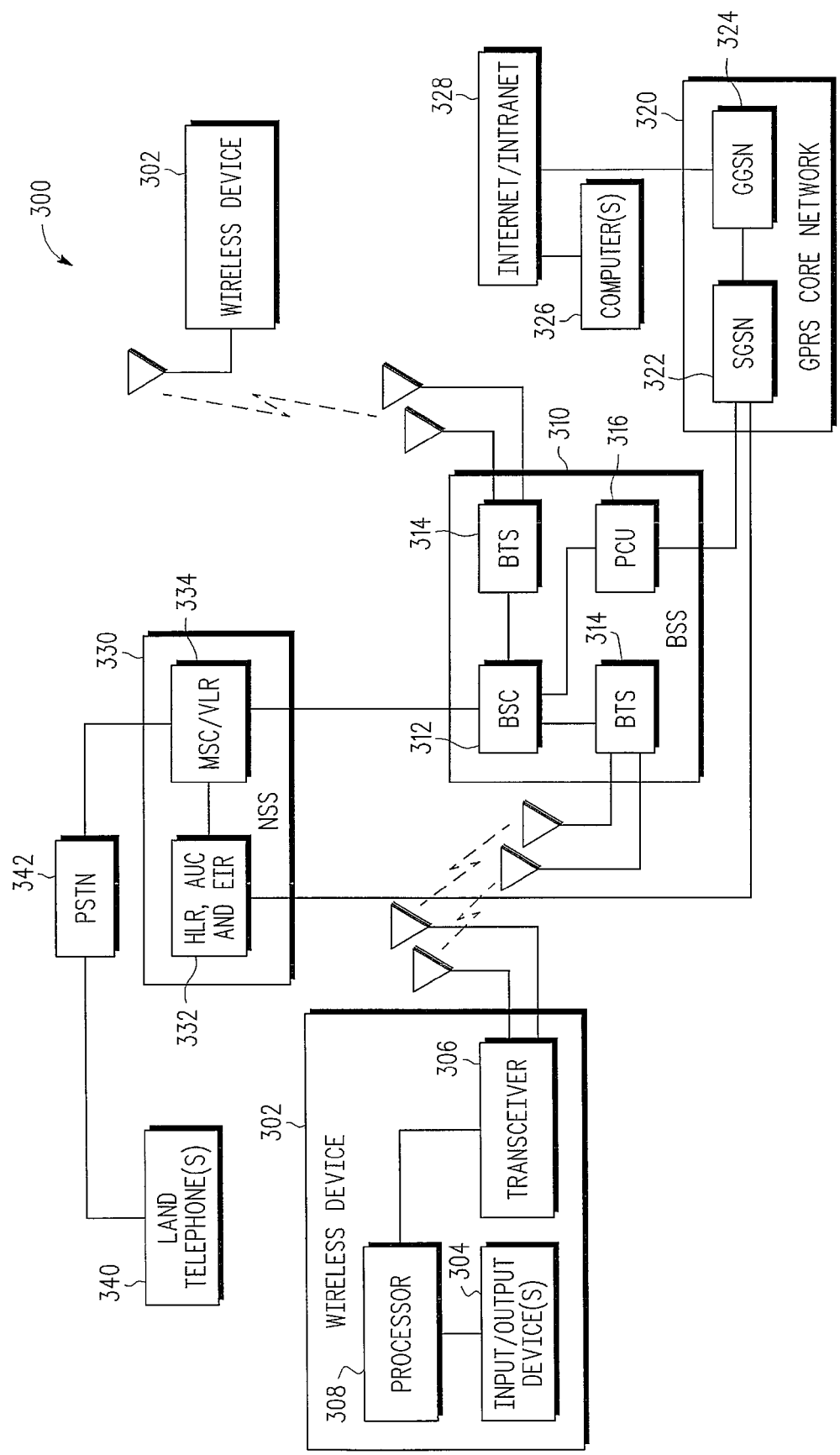
FIG. 3 is a block diagram of an example wireless communication system whose base station (BS) and subscriber station (SS) transceivers may be configured according to various embodiments of the present disclosure.

With reference to FIG. 3, an example wireless communication system 300 is depicted that includes a plurality of subscriber stations or wireless devices 302, e.g., hand-held computers, personal digital assistants (PDAs), cellular telephones, etc., that may be calibrated according to one or more embodiments of the present disclosure. In general, the wireless devices 302 include one or more processors 308 (e.g., digital signal processors (DSPs)), a transceiver 306, and one or more input/output devices 304 (e.g., a camera, a keypad, display, etc.), among other components not shown in FIG. 3. The wireless devices 302 communicate with a base station controller (BSC) 312 of a base station subsystem (BSS) 310, via one or more base transceiver stations (BTS) 314, to receive/transmit voice and/or data and to receive/transmit control signals. The BSC 312 may, for example, employ a scheduler for assigning one or more reference signals (RSs) to each of the wireless devices 302. In general, the BSC 312 may also be configured to choose a modulation and coding scheme (MCS) for each of the devices 302, based on channel conditions.

The BSC 312 is also in communication with a packet control unit (PCU) 316, which is in communication with a serving general packet radio service (GPRS) support node (SGSN) 322. The SGSN 322 is in communication with a gateway GPRS support node (GGSN) 324, both of which are included within a GPRS core network 320. The GGSN 324 provides access to computer(s) 326 coupled to Internet/intranet 328. In this manner, the wireless devices 302 may receive data from and/or transmit data to computers coupled to the Internet/intranet 328. For example, when the devices 302 include a camera, images may be transferred to a computer 326 coupled to the Internet/intranet 328 or to another one of the devices 302. The BSC 312 is also in communication with a mobile switching center/visitor location register (MSC/VLR) 334, which is in communication with a home location register (HLR), an authentication center (AUC), and an equipment identity register (EIR) 332. In a typical implementation, the MSC/VLR 334 and the HLR, AUC, and EIR 332 are located within a network and switching subsystem (NSS) 330, which performs various functions for the system 300. The SGSN 322 may communicate directly with the HLR, AUC, and EIR 332. As is also shown, the MSC/VLR 334 is in communication with a public switched telephone network (PSTN) 342, which facilitates communication between wireless devices 302 and land telephone(s) 340.

Accordingly, a number of transceiver calibration techniques have been disclosed herein that generally reduce LO feed-through in a transceiver.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of software, firmware or hardware. As a preparatory step to practicing the invention in software, code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a hard disk or a random access memory (RAM). The method form of the invention may be practiced by combining one or more machine-readable storage devices containing the code according to the present invention with appropriate standard hardware to execute the code contained therein.

Although the invention is described herein with reference to specific embodiments, various modifications and changes can be made without departing from the scope of the present invention as set forth in the claims below. For example, many of the calibration techniques disclosed herein are broadly applicable to a variety of different communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of calibrating a transceiver, comprising:
providing, from an output node of a transmitter of the transceiver, a calibration signal to an input node of a receiver of the transceiver;
down-converting, with the receiver, the calibration signal to provide a down-converted calibration signal;
performing a discrete Fourier transform on the down-converted calibration signal; and
determining one or more correction factors based on an analysis of the discrete Fourier transform of the down-converted calibration signal, wherein at least one of the one or more correction factors facilitate substantial cancellation of a direct current offset associated with the transceiver.

2. The method of claim 1, wherein the one or more correction factors correspond to one or more receiver correction factors and the method further comprises:
substantially cancelling the direct current offset associated with the receiver based on the at least one of the one or more receiver correction factors.

3. The method of claim 1, further comprising:
selectively coupling the output node of the transmitter to the input node of the receiver using a switch.

4. The method of claim 1, further comprising:
applying a transmitter calibration signal to an input node of the transmitter;
down-converting the transmitter calibration signal to provide a down-converted transmitter calibration signal;
performing a discrete Fourier transform on the down-converted transmitter calibration signal; and
determining one or more transmitter correction factors based on an analysis of the discrete Fourier transform of the down-converted transmitter calibration signal, wherein at least one of the one or more transmitter correction factors facilitate substantial cancellation of a direct current offset associated with the transmitter.

5. The method of claim 1, wherein the at least one of the one or more correction factors is subtracted from a baseband input signal that is to be transmitted to substantially cancel the direct current offset associated with the transceiver.

6. The method of claim 1, further comprising:
powering down a power amplifier of the transmitter during the calibrating of the transceiver to substantially eliminate spurious emissions.

7. The method of claim 1, wherein the providing, from an output node of a transmitter of the transceiver, a calibration signal to an input node of a receiver of the transceiver further comprises:
injecting a direct-current only voltage signal into a first input of a transmit mixer of the transmitter;
injecting a transmit carrier signal into a second input of the transmit mixer; and
providing, from the output node of the transmitter, the calibration signal to the input node of the receiver, wherein the calibration signal is provided from an output of the transmit mixer and is based on the transmit carrier signal and the direct-current only voltage signal.

8. The method of claim 1, further comprising:
storing the correction factors in a look-up table.

9. The method of claim 1, wherein the discrete Fourier transform is a fast Fourier transform.

10. A method of calibrating a transceiver, comprising:
applying a first transmitter calibration signal to an input node of a transmitter of the transceiver;
down-converting, with a receiver of the transceiver, an up-converted version of the first transmitter calibration signal to provide a down-converted transmitter calibration signal;
performing a discrete Fourier transform on the down-converted transmitter calibration signal; and
determining one or more transmitter correction factors based on an analysis of the discrete Fourier transform of the down-converted transmitter calibration signal, wherein at least one of the one or more transmitter correction factors facilitate substantial cancellation of a direct current offset associated with the transmitter.

11. The method of claim 10, wherein the at least one of the one or more transmitter correction factors is subtracted from a baseband input signal that is to be transmitted to substantially cancel the direct current offset associated with the transmitter.

12. The method of claim 11, wherein the transmitter calibration signal is only provided to an in-phase receive path of the receiver or a quadrature receive path of the receiver.

13. The method of claim 10, further comprising:
powering down a power amplifier of the transmitter during the calibrating of the transceiver to substantially eliminate spurious emissions.

14. The method of claim 10, further comprising:
selectively coupling an output node of the transmitter to an input node of the receiver using a switch.

15. The method of claim 10, wherein the transmitter calibration signal is a single frequency baseband signal.

16. The method of claim 10, wherein the up-converted version of the transmitter calibration signal corresponds to a single sideband signal.

17. The method of claim 10, further comprising:
modifying a frequency of the first transmitter calibration signal to provide at least one additional transmitter calibration signal; and
determining one or more additional transmitter correction factors based on an analysis of a discrete Fourier transform of a down-converted version of the additional transmitter calibration signal, wherein at least one of the one or more additional transmitter correction factors facilitate substantial cancellation of a direct current offset associated with the transmitter at the modified frequency.

18. The method of claim 10, further comprising:
substantially cancelling the direct current offset associated with the transmitter based on the at least one of the one or more transmitter correction factors.

19. A wireless communication device, comprising:
a transmitter; and
a receiver, wherein an input node of the receiver is configured to receive a calibration signal from an output node of the transmitter, and wherein the receiver is configured to down-convert the calibration signal to provide a down-converted calibration signal, where the receiver is configured to perform a discrete Fourier transform on the down-converted calibration signal and determine one or more correction factors based on an analysis of the discrete Fourier transform of the down-converted calibration signal, and where at least one of the one or more correction factors facilitate substantial cancellation of a direct current offset associated with the wireless communication device.

20. The wireless communication device of claim 19, further comprising:
a power amplifier associated with the transmitter, wherein the power amplifier is configured to be powered-down during calibration to substantially eliminate spurious emissions.

* * * * *